(No Model.) 3 Sheets—Sheet 1.
M. C. WALKER.
MAIN TAPPING MACHINE.
No. 549,619. Patented Nov. 12, 1895.
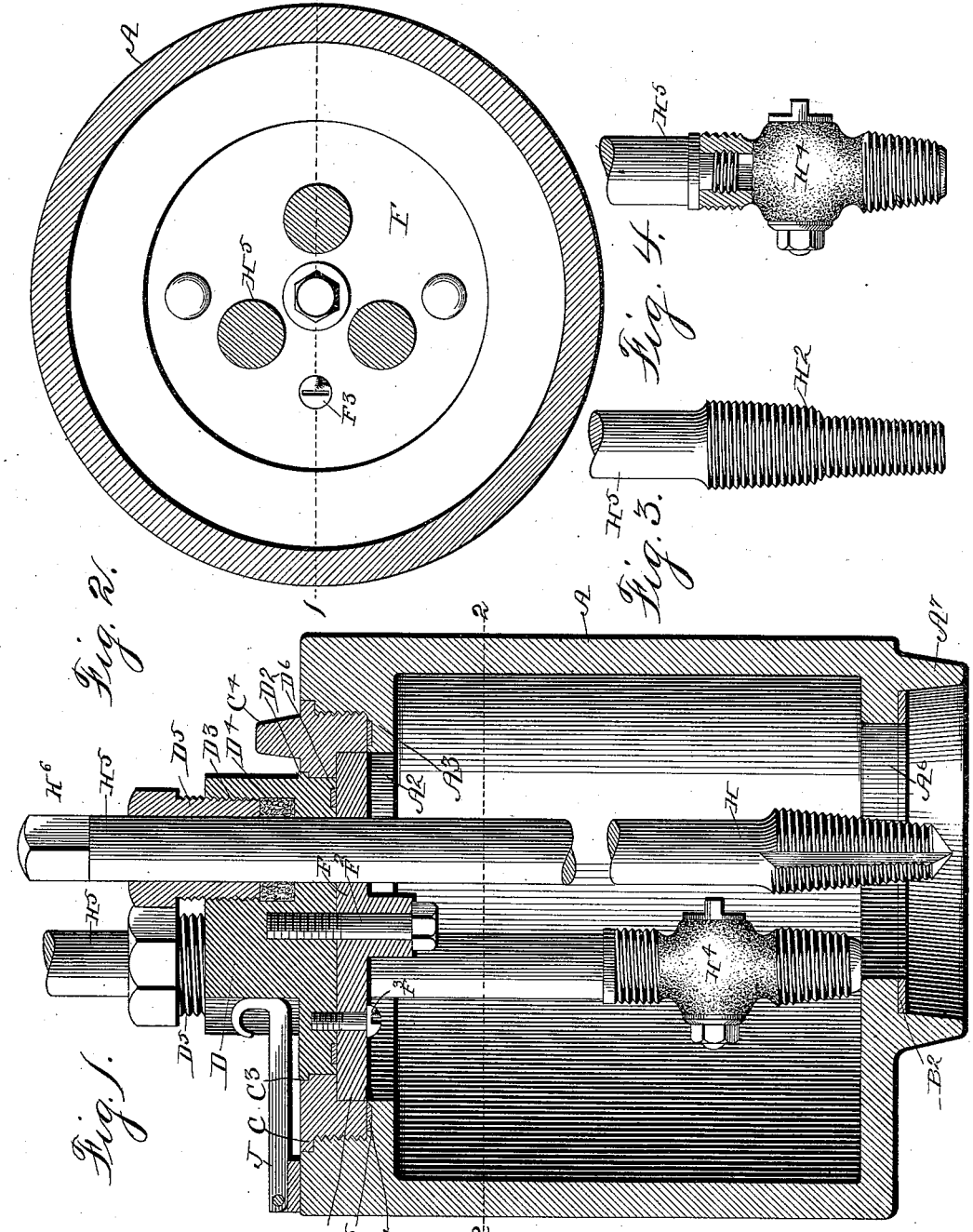
Witnesses:
W. J. Dankey.
R. G. Orwig.
Inventor: Matthew C. Walker,
By Thomas G. and J. Ralph Orwig, Attys.

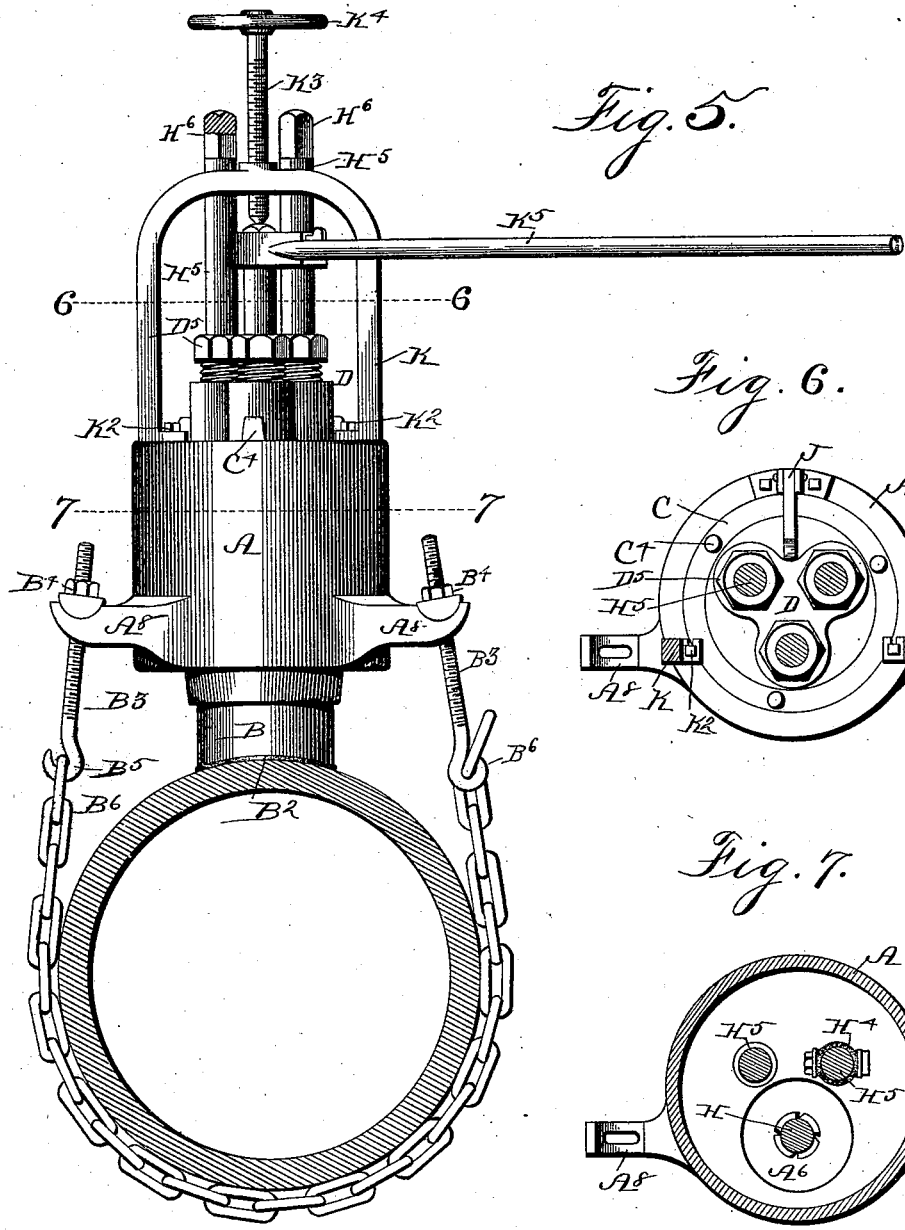

(No Model.)  3 Sheets—Sheet 3.
M. C. WALKER.
MAIN TAPPING MACHINE.
No. 549,619. Patented Nov. 12, 1895.
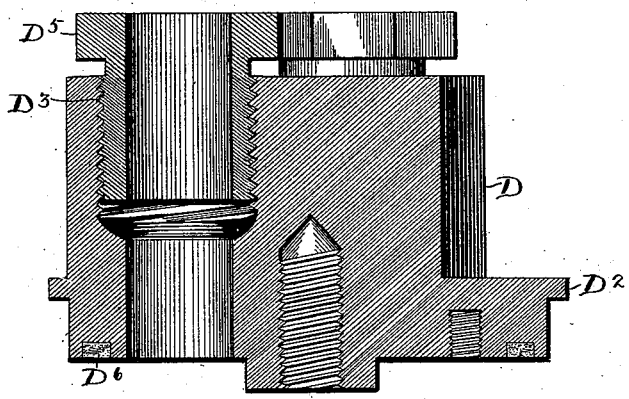
Fig. 8.
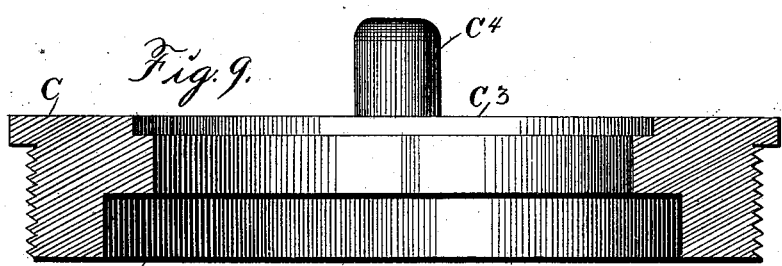
Fig. 9.
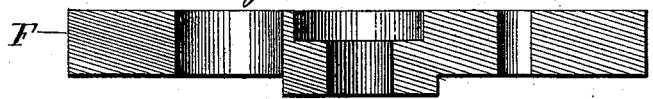
Fig. 10.
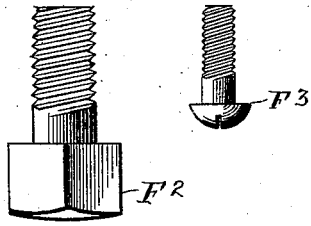

UNITED STATES PATENT OFFICE.

MATTHEW C. WALKER, OF DES MOINES, IOWA.

MAIN-TAPPING MACHINE.

SPECIFICATION forming part of Letters Patent No. 549,619, dated November 12, 1895.

Application filed April 13, 1895. Serial No. 545,642. (No model.)

*To all whom it may concern:*

Be it known that I, MATTHEW C. WALKER, a citizen of the United States of America, residing at Des Moines, in the county of Polk and State of Iowa, have invented an Improved Main-Tapping Machine, of which the following is a specification.

The object of this invention is to provide a rotatable cap for main-tapping machines which is simple in construction, so arranged that a water or gas tight joint may be easily made and maintained between the cap and the body of the machine, and, further, to provide a cap that may be easily rotated to bring the various tools held therein into position.

My invention consists in certain details in the construction, arrangement, and combination of the various parts of the device, as hereinafter set forth, pointed out in my claim, and illustrated in the accompanying drawings, in which—

Figure 1 is a vertical sectional view through the dotted line 1 1 of Fig. 2. Fig. 2 is a horizontal sectional view through the line 2 2 of Fig. 1. Fig. 3 is an enlarged detail view showing a screw-threaded plug. Fig. 4 is a like view of a faucet detachably connected with one of the tool-shafts. Fig. 5 shows the complete device applied to a main. Fig. 6 is a horizontal sectional view through the line 6 6 of Fig. 5. Fig. 7 is a like view through the line 7 7. Figs. 8, 9, and 10 show the rotatable cap and collar for supporting the same in vertical section and detached.

Referring to the accompanying drawings, the reference-letter A is used to indicate the main frame, approximately cylindrical in shape, with a circular opening $A^2$ in its top internally screw-threaded and a horizontal inwardly-projecting flange $A^3$. This flange has an annular recess $A^4$ in its top surface to admit a washer $A^5$. The bottom of the cylinder A has a circular opening $A^6$ eccentrically arranged therein and a downwardly-projecting flange $A^7$ around the opening.

$A^8$ indicate bifurcated lugs formed integral with and projecting horizontally outward from the sides of the frame A.

To connect the frame with a main, I have provided a saddle B in the form of a circular rim, designed to enter the flange $A^7$ and having a concaved lower surface shaped to conform to the main. Washers $B^2$ are placed between the top of the saddle B and the bottom of the frame and between the saddle and main to produce tight joints when forced together.

$B^3$ indicates a screw-threaded bolt placed in one of the bifurcated lugs $A^8$, and having a nut $B^4$ on top of the lug and a hook $B^5$ on its lower end.

$B^6$ indicates a chain detachably connected with the said hook and adapted to be passed around the main. A like bolt is connected with the opposite lug.

It is obvious that by screwing down the nuts $B^4$ the frame will be firmly held to the main and a tight joint be provided between the main and the interior of the frame A.

C indicates a collar to be screwed into the top of the frame A to provide a bearing for a rotatable cap, hereinafter described. This collar has on its inner face an annular recess $C^2$ at its bottom and a smaller recess $C^3$ at its top, and on its top surface are formed a number of projections $C^4$, which are of service when turning the collar to screw it in or out of the frame A.

The various tools used in tapping a main are supported in a rotatable cap in the top of the frame, composed of a part D with its base fitted in the collar and an annular shoulder $D^2$ in its top to enter the recess $C^3$, thus limiting the downward movement of the cap. On the central portion of the top is formed a trefoil-shaped extension. In the center of each wing of the extension is a vertical bore $D^3$, enlarged at its upper end to admit the packing $D^4$ and screw-threaded at its upper end to admit the bushing $D^5$, which also serves to adjust the packing. In the bottom of this part D is an annular groove, in which is placed a packing-ring $D^6$.

F indicates the under part of the cap, comprising a flat-topped disk of a size to fit in the annular recess $C^2$. This part is detachably connected with the upper part by means of a central bolt $F^2$ and a screw $F^3$.

The tools comprise a combined drill and threader H, a screw-threaded plug $H^2$, and a device $H^3$ for holding a faucet $H^4$. This latter is screw-threaded at its lower end to engage the top of the faucet, and when turned in a reverse direction will disengage from the faucet. Each of these tools has a straight shank $H^5$ of a size adapted to be passed through the openings in the cap and is provided with an angular formation $H^6$ at its top. The three tools are placed in position, and on starting a hole the drill is first turned until it reaches the center of the opening in the bottom of the frame. To secure the drill in this position, a gravity-pawl J is pivoted to the top of the frame A to enter the notches between the enlargements on the top. When the hole has been drilled, the pawl is elevated and the cap rotated until the pawl can drop into the next notch, in which position the next tool will be directly over the hole thus bored.

To provide means for applying a pressure to the tools as they are being rotated, I have arranged an arched frame K, secured to the top of the frame by bolts $K^2$, in such a position that its center will be directly over the center of the opening in the bottom of the frame. $K^3$ indicates a screw-threaded shaft extending vertically through said frame with a hand-wheel $K^4$ fixed to its top. A movement of the hand-wheel will force the shaft downwardly, and the shaft in turn will feed the drill into the main as the drill is turned by the ratchet-lever $K^5$ or any suitable means. It is obvious that this feed device may be applied in succession to each tool as it is brought under the arch by turning the cap.

With the construction of cap shown and described it is obvious that ready access may be had to the interior of the machine without disturbing the gas-tight joint in the rotatable cap by unscrewing the part C. It is obvious that wear upon the surfaces subjected to frictional engagement when the cap is turned may be compensated for by an adjustment of the screw $F^2$, and also that ground surfaces may be easily and conveniently formed where it is necessary to make tight joints.

I claim as my invention—

The combination in a main tapping machine of an annular collar screw-threaded on its exterior designed to be screwed into the top of the machine body and having an annular recess at its inner lower surface and another at its inner top surface, a rotatable cap designed to enter said collar and having an annular flange on its outer surface to enter said upper recess, and a disk designed to enter said lower recess and screws for holding said cap and disk together, substantially as and for the purposes stated.

MATTHEW C. WALKER.

Witnesses:
J. RALPH ORWIG,
THOMAS G. ORWIG.